United States Patent

Kamada et al.

[11] 3,965,212
[45] June 22, 1976

[54] FLAME-RESISTANT RESIN COMPOSITION

[75] Inventors: Kazumasa Kamada; Ryoji Handa; Masafumi Hongo, all of Ohtake, Japan

[73] Assignee: Mitsubishi Rayon Co., Ltd., Tokyo, Japan

[22] Filed: Dec. 3, 1974

[21] Appl. No.: 529,080

[30] Foreign Application Priority Data

Dec. 4, 1973  Japan.............................. 48-134853
May 8, 1974  Japan.............................. 49-50218

[52] U.S. Cl. ........................... 260/835; 260/837 R; 260/DIG. 24
[51] Int. Cl.$^2$........................................ C08G 45/14
[58] Field of Search ....... 260/835, 45.75 B, DIG. 24

[56] References Cited
UNITED STATES PATENTS

| | | | |
|---|---|---|---|
| 3,361,848 | 1/1968 | Siggel.................................. | 260/873 |
| 3,560,605 | 2/1971 | Siggel.................................. | 260/835 |
| 3,621,074 | 11/1971 | Siggel.................................. | 260/835 |

Primary Examiner—Murray Tillman
Assistant Examiner—T. Pertilla
Attorney, Agent, or Firm—Oblon, Fisher, Spivak, McClelland & Maier

[57] ABSTRACT

A flame-resistant resin composition consisting essentially of 100 parts by weight of polytetramethylene terephthalate, 3 to 40 parts by weight of a flame retardant represented by the general formula,

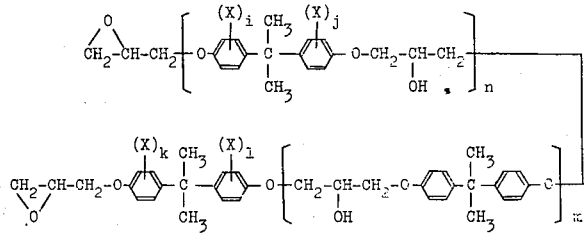

wherein $n + m$ is a number of 0 to 10; X is a bromine or chlorine atom; and $i, j, k$ and $l$ are individually an integer of 1 to 4, and antimony trioxide, the weight ratio of said flame retardant to said antimony trioxide being in the range of from 0.25 to 6. This composition is excellent in mechanical properties, thermal properties and moldability, and causes no spread of fire to other materials even when dripped at the time of combustion.

10 Claims, No Drawings

FLAME-RESISTANT RESIN COMPOSITION

This invention relates to a resin composition composed mainly of polytetramethylene terephthalate which is excellent in mechanical properties, particularly toughness, and which has been made flame resistant without causing any degradation in moldability and in appearance of molded article.

As predicted from its polymer structure, polytetramethylene terephthalate has no such problem of hygroscopicity as in the case of nylon resins, and is so much higher in crystallization rate than polyetheylene terephthalate resin, that when subjected to injection molding, it crystallizes successfully even at a mold temperature of below 100°C., and thus has little problem in moldability as well.

Thus, polytetramethylene terephthalate is well-balanced in all such resin characteristics as hygroscopicity, moldability, mechanical properties and thermal properties, and hence is expected to be a new industrial resin. Like other resins, however, the polytetramethylene terephthalate resin also has a problem of flammability.

It is well known in general that halogen-substituted aromatic compounds are effective as flame retardants for thermoplastic resins, particularly those which are required to be molded at elevated temperatures. Most halogen-substituted aliphatic compounds, such as chlorinated paraffins, thermally decompose below 230°C., while polytetramethylene terephthalate is ordinarily molded above 230°C. and hence are not usable as flame retardants for polytetramethylene terephthalate and the like. However, most of halogen-substituted aromatic compounds do not decompose even when subjected to molding at high temperatures. For example, when hexabromobenzene and antimony trioxide are mixed with polytetramethylene terephthalate and the resulting mixture is molded, the molding can be effected without causing decomposition of the hexabromobenzene, and flame resistance can tentatively be imparted to the molded article. However, even when halogen-substituted aromatic compounds, such as hexabromobenzene, tetrabromophthalic anhydride and the like, are used as flame retardants, there are encountered such serious drawbacks as mentioned below.

When the halogen-substituted aromatic compound is used as flame retardant, no decomposition of the compound takes place at the molding state, but there is brought about the disadvantage that the flame retardant comes up to the surface of the molded article to make the appearance thereof turbid. This is because the flame retardant is somewhat volatile or sublimable. Further, the halogen-substituted aromatic compound is quite susceptible to the atmosphere, particularly temperature, in which the molded article is placed, and when the molded article is allowed to stand over a long period of time even at 50°C., there is a fear that the compound is often deprived of its flame retarding effect and the molded article becomes flammable. For example, a molded article obtained from a mixture of polytetramethylene terephthalate, hexabromobenzene and antimony trioxide is self-extinguishing, showing a flame retardancy of 28.5 in terms of LOI (least oxygen index), though when allowed to stand in an oven at 150°C., the molded article becomes flammable within such a short period as 10 days, showing a LOI value of 23.

In order for a material to attain the self-extinguishing grades V-O and V-I regulated in the flamability test according to Underwriters' Laboratories Bulletin 94 (hereinafter abbreviated to "UL-94"), the material is required to have a short combustion time and not to ignite cotton placed below the material due to dripping caused at the time of combustion. Accordingly, not only the combustion time but also the shape variation and dripping when the material is exposed to flame should sufficiently be taken into consideration. For example, when a material is exposed to flame, if a part of the material in the neighbourhood of ignition place falls down as a chunk, the cotton placed below the material tends to ignite, and if the material fuses owing to the flame before extinguishment to drip, the cotton also tends to ignite. In order to prevent such a spread of flame, it is necessary to impart to the material such a property as not to drip even when exposed to flame or such a property as not to ignite the cotton even when allowed to drip.

Further, the aforesaid flame retardants have the drawback that when polytetramethylene terephthalate is incorporated with the flame retardants and subjected to molding, the resulting molded articles are greatly deteriorated in mechanical properties, particularly toughness. For example, a molded article, which has been obtained from a mixture of polytetramethylene terephthalate, antimony trioxide and each of tetrabromophthalic anhydride, tetrabromobisphenol A, hexabromobenzene and the like, shows, in a tensile test, an elongation at break as low as only less than 10 percent, despite the fact that the elongation at break of polytetramethylene terephthalate itself is 40 to several hundreds percent.

The present inventors have conducted extensive studies with an aim to obtain a flame retardant which, when used in making polytetramethylene terephthalate flame-resistant, does not escape from the molded article nor comes up to the surface thereof, and which can successfully make polytetramethylene terephthalate flame-resistant without deteriorating the excellent mechanical properties, particularly toughness, inherent thereto and without affecting at all other resin characteristics thereof such as thermal properties and moldability. As a result, the inventors have found that a resin composition excellent in flame resistance can be obtained by mixing polytetramethylene terephthalate with a flame retardant represented by the general formula (I),

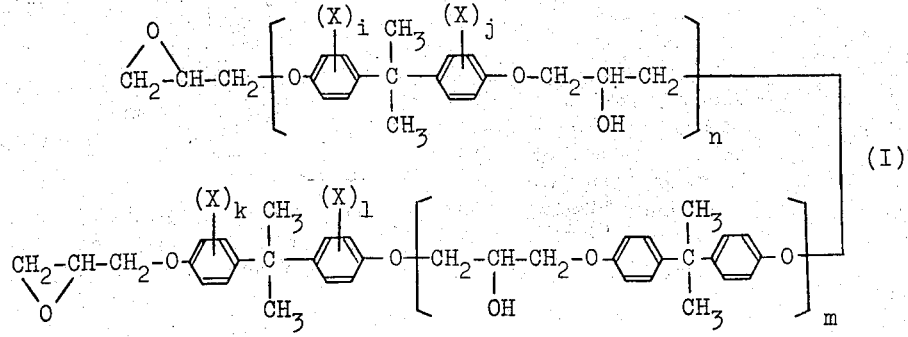

(I)

wherein $n + m$, which represents an average degree of polymerization, is a number of 0 to 10; X is a bromine or chlorine atom; and $i, j, k$ and $l$ are individually an integer of 1 to 4, and with antimony trioxide.

In accordance with the present invention, there is provided a flame resistant resin composition consisting essentially of 100 parts by weight of a polytetramethylene terephthalate, 3 to 40 parts by weight of a flame retardant represented by the above-mentioned general formula (I), and antimony trioxide, the weight ratio of said flame retardant to said antimony trioxide being 0.25 to 6.

The polytetramethylene terephthalate used in the present invention includes one synthesized from 1,4-butanediol and dimethyl terephthalate according to the process disclosed in, for example, "Journal of Polymer Science", Vol. 4, pgs. 1851 –1859 (1966), polymers obtained by copolycondensing these components with less then 15 mole percent of, for example, ethylene glycol, 1,3-propanediol, an aromatic dicarboxylic acid such as terephthalic or isophthalic acid, or an aliphatic dicarboxylic acid, and a mixture of polytetramethylene terephthalate and less than 40% by weight of other polymers such as, for example, polycarbonate, polystyrene, polymethyl methacrylate, polyethylene terephthalate, polyethylene, polypropylene, ABS resin or nylon. The intrinsic viscosity $[\eta]$ of the polytetramethylene terephthalate is preferably in the range of 0.4 to 5.0 dl/g, as measured at 25°C. in an equal weight mixture of tetrachloroethane and phenol. Considering the flowability in the injection molding step, and the mechanical properties of the finally obtained molded article, however, the intrinsic viscosity is more preferably in the range from 0.6 to 3.0 dl/g.

The compound of the formula (I) used as the flame retardant, is obtained by the condensation of, for example, epichlorohydrin with tetrabromobisphenol A alone or in admixture with bisphenol A, and has a halogen content of at least 10% by weight. In the formula (I), $n + m$ shows an average degree of polymerization, and is a number of 0 to 10 (including 0). The values of $n$ and $m$ may be freely varied within the $n + m$ range from 0 to 10 by varying the blending proportions of the halogenated bisphenol and the bisphenol A in the condensation step for the halogenated epoxy resin. When the resulting composition is desired to be greatly enhanced in flame resistance in consideration of the practicality thereof, it is preferable to use a flame retardant having the formula (I), wherein $i = j = k = l = 2$ and $m = 0$, which is easily synthesizable and high in halogen content. A flame retardant having such a high molecular weight that $n + m$ exceeds 10 is not uniformly dispersible in a polytetramethylene terephthalate, with the result that the composition is deteriorated in resin characteristics.

The amount of the flame retardant to be added is properly determined according to the desired extent of flame resistance, though is preferably 3 to 40 parts, more preferably 5 to 25 parts, by weight per 100 parts by weight of the polytetramethylene terephthalate. If the amount of the flame retardant is too small, a sufficient flame resistance cannot be attained, while if the amount thereof is too large, the resulting composition is undersirably deteriorated in resin characteristics.

The amount of the antimony trioxide to be used in combination with the flame retardant of the formula (I) is such that the weight ratio of flame retardant to antimony trioxide is preferably a value in the range from 0.25 to 6, more preferably from 0.5 to 4. If the said value is less than 0.25, the proportion of antimony trioxide becomes so large as to deteriorate the resulting composition in mechanical properties, particularly toughness, while if the said value is more than 6, substantially no synergistic effect is attained by addition of antimony trioxide. When the amount of the flame retardant is relatively small, it is preferable to set the amount of antimony trioxide added so that the flame retardant to antimony trioxide weight ratio becomes less than 1.0 and when the amount of the flame retardant is relatively large, it is preferable to set the amount of antimony trioxide added so that the flame retardant to antimony trioxide weight ratio becomes more than 1.0.

In preparing the composition of the present invention, there may be adopted such a procedure that a flame retardant of the formula (I) and antimony trioxide are added to a molten polytetramethylene terephthalate during or after polymerization reaction, or are added to chips of a polytetramethylene terephthalate. For example, there is employed the procedure that sufficiently dried polytetramethylene terephthalate in the form of chips, a flame retardant of the formula (I) and antimony trioxide are blended together in a V-shape blender, and the resulting mixture is then fused and kneaded by means of an extruder or the like. If desired, the composition of the present invention may be incorporated with fillers such as glass fibers and additives such as light- or heat-stabilizers, dyes, pigments and the like. For example, the composition of the present invention is reinforced with glass fibers to give a self-extinguishing resin composition enhanced in mechanical and thermal properties. In this case, however, the composition is more or less degraded in property of preventing the spread of fire to other materials. In order to provide sufficient flame resistance, the amount of flame retardant added should be made larger. When used at high temperatures, however, a composition containing a large amount of the flame retardant is greatly colored and thus is degraded in commodity value. Such a composition should therefore be put into uses where heat resistance is not so much required and higher mechanical properties are required.

The resin composition of the present invention is excellent in mechanical properties, thermal properties and moldability, and has such excellent flame resistance that even when the composition drips at the time of combustion, the drips do not ignite other materials. At a place where a fire can actually break out, there are present not only flame resistant materials but also combustibles. Accordingly, the resin composition of the present invention which does not cause the spread of fire is quite useful.

The present invention is illustrated in detail below with reference to examples, but the examples are by way of illustration and not by way of limitation.

In the examples, the intrinsic viscosity is a value as measured at 25°C. in an equal weight mixture of tetrachloroethane and phenol.

EXAMPLE 1

In a V-shaped blender, there were blended 8.13 kg. of a sufficiently dried polytetramethylene terephthalate having an intrinsic viscosity $[\eta]$ of 0.90 dl/g, 1.22 kg. of a flame retardant (A) represented by the formula,

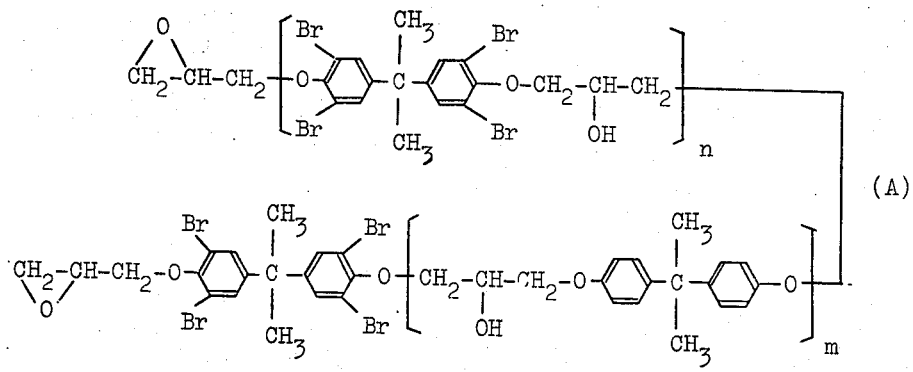

wherein $n \doteq 2$, $m \doteq 0.8$, and bromine content = 48% by weight, and 0.65 kg. of antimony trioxide together for 5 minutes. The resulting mixture was shaped into pellets by means of a vent-type extruder of 40 mm, in diameter at a cylinder temeperature of 200° to 240°C. to obtain a resin composition of the present invention.

This composition was molded by use of a 36 mm-diameter screw-type injection molding machine of about 5 oz. in volume at a cylinder temperature of 250°C., a mold temperature of 60°C., and a molding cycle of 60 seconds to prepare a dumbbell-shaped 3.2 mm-thick test piece for tensile test, a 3.2 mm-thick test piece for measurement of impact strength, and a 6.4 mm-thick test piece for measurement of heat distortion temperature.

All of these test pieces were white and had quite excellent appearances, without any shrink-mark and warpage and without surface turbidity due to coming-up of the flame retardant. These test pieces were tested for mechanical properties to obtain the results shown in Table 1.

For comparison, test pieces were prepared in entirely the same manner as above, except that other flame retardants were used. The mechanical properties of these test pieces were also shown in Table 1.

In Tables 1 to 3, "tensile strength at break" and "tensile elongation at break" show values as measured according to ASTM D-638; "flexural strength" and "modulus of flexural elasticity" show values as measured according to ASTM D-790; "Izod impact strength" shows a value as measured according to ASTM D-256 (with notch); "heat distortion temperature" shows a value as measured according to ASTM D-648 (load 264 psi); "flame resistance" shows a value as measured according to ASTM D-2863; and "toughness" shows a value obtained by determining a breaking energy from the area below the stress-strain curve, and then dividing the breaking energy by the unit energy.

Table 1

|  | Example 1 | Comparative Example 1 | Comparative Example 2 | Comparative Example 3 | Comparative Example 4 |
|---|---|---|---|---|---|
| Polytetramethylene terephthalate (kg) | 8.13 | 8.13 | 8.13 | 8.13 | 10.00 |
| Flame retardant Kind | Flame retardant (A) | Br-substituted benzene | HO-bisphenol-Br | Br-phthalic anhydride | — |
| kg (wt.%)*1 | 1.22 (15.0) | 1.22 (15.0) | 1.22 (15.0) | 1.22 (15.0) | — |
| Antimony trioxide (kg) | 0.65 | 0.65 | 0.65 | 0.65 | — |
| (Flame retardant/antimony trioxide weight ratio) | (1.875) | (1.875) | (1.875) | (1.875) | — |
| Tensile strength at break (kg/cm²) | 549 | 508 | 501 | 440 | 310 (553)*2 |
| Tensile elongation at break (%) | 11.8 | 4.2 | 3.2 | 1.8 | 46.1 (4.2)*2 |
| Flexural strength (kg/cm²) | 935 | 945 | 830 | 730 | 815 |
| Modulus of flexural elasticity (× 10⁴ kg/cm²) | 2.4 | 2.5 | 2.4 | 2.5 | 2.4 |
| Izod impact strength (kg.cm/cm) | 1.2 | 1.0 | 1.1 | 0.9 | 1.0 |
| Heat distortion temperature (°C) | 55 | 57 | 54 | 47.5 | 55 |
| Toughness | 27.8 | 8.0 | 6.5 | 2.1 | 14.8 |

Table 1-continued

|  | Example 1 | Comparative Example 1 | Comparative Example 2 | Comparative Example 3 | Comparative Example 4 |
| --- | --- | --- | --- | --- | --- |
| Flame resistance (LOI) | 29.5 | 30.0 | 30.0 | 27.5 | 20.5 |
| Appearance of molded article | White. Excellent | White. Flame retardant came up to the surface | Reddish brown | White. Surface turbid | White. Excellent |

Note:
[*1] Weight % of flame retardant based on the weight of polytetramethylene terephthalate.
[*2] Figures in the parentheses show yield values.

As is clear from Table 1, the molded article obtained from the composition of the present invention has no haze due to the migration of flame retardant to the surface as seen in the Comparative Examples, has a good appearance, has favorable mechanical properties without being deteriorated in toughness, moldability and thermal properties, and is excellent in flame resistance.

In contrast when hexabromobenzene or tetrabromophthalic anhydride is used as the flame retardant, as in Comparative Example 1 or 3, the molded article comes to have a haze on its surface. Although there is relatively small deterioration in initial physical properties due to incorporation of flame retardant, a marked degradation takes place in important physical properties, particularly toughness. That is, the toughness of the molded article in the Comparative Example is about one-tenth to one-fourth of that of the composition of the present invention, so that the molded article is easily destroyed when a somewhat great flexural force is applied thereto, and thus cannot be put into practical use. The tetrabromobisphenol A used in Comparative Example 2 is the starting material for the flame retardant employed as a constituent of the present composition. When said compound is used, however, the resulting molded article is somewhat colored to reddish brown and becomes extremely inferior in toughness. Thus, a composition, which is excellent not only in mechanical properties, particularly toughness, but also in flame resistance without any degradation in appearance and other physical properties, cannot be obtained unless the flame retardant employed has such a structure as that of the flame retardant (A), as in the present invention.

EXAMPLES 2 and 3

To a sufficiently dried polytetramethylene terephthalate having an intrinsic viscosity $[\eta]$ of 0.93 dl/g, the flame retardant (A) and antimony trioxide were added in such proportions as shown in Table 2. The resulting mixture was treated in the same manner as in Example 1 to obtain a flame-resistant resin composition of the present invention. This composition was subjected to injection molding at a molding temperature of 250°C. to prepare molded test pieces, which were then tested in the same manner as in Example 1 to obtain the results shown in Table 2.

Table 2

|  | Example 2 | Example 3 |
| --- | --- | --- |
| Polytetramethylene terephthalate (kg) | 8.33 | 8.00 |
| Flame retardant (A) (kg) | 1.25 | 1.6 |
| (wt. %)* | (15) | (20) |
| Antimony trioxide (kg) | 0.42 | 0.4 |
| (Flame retardant/antimony trioxide weight ratio) | (3.0) | (4.0) |
| Tensile strength at break (kg/cm²) | 555 | 522 |
| Tensile elongation at break (%) | 12.5 | 13.1 |
| Flexural strength (kg/cm²) | 938 | 930 |
| Modulus of flexural elasticity ($\times 10^4$ kg/cm²) | 2.4 | 2.35 |
| Izod impact strength (kg.cm/cm) | 1.3 | 1.2 |
| Heat distortion temperature (°C.) | 54.5 | 53.0 |
| Toughness | 31.3 | 32.0 |
| Flame resistance (LOI) | 29.0 | 31.0 |
| Appearance of molded article | White. Excellent | White. Excellent |

Note:
*weight % of flame retardant based on the weight of polytetramethylene terephthalate.

As is clear from Table 2, each of the compositions of the present invention is white, has an excellent appearance with no surface haze, is excellent in mechanical properties, particularly in toughness, is not deteriorated in thermal properties, and is excellent in flame resistance.

EXAMPLES 4 to 6

To a sufficiently dried polytetramethylene terephthalate having an intrinsic viscosity $[\eta]$ of 0.90 dl/g, the flame retardant (A) and antimony trioxide were added in such proportions as shown in Table 3. The resulting mixture was treated in the same manner as in Example 1 to obtain a flame-resistant resin composition of the present invention. This composition was subjected to injection molding at a molding temperature of 250°C. to prepare molded test pieces, which were then tested in the same manner as in Example 1 to obtain the results shown in Table 3.

For comparison, test pieces were prepared in the same manner as above, except that the amounts of the components constituting the composition were varied. The mechanical properties of these test pieces were also shown in Table 3.

Table 3

| | Example 4 | Example 5 | Example 6 | Comparative Example 5 | Comparative Example 6 | Comparative Example 7 | Comparative Example 8 |
|---|---|---|---|---|---|---|---|
| Polytetramethylene terephthalate (kg) | 8.33 | 8.06 | 8.33 | 7.14 | 5.88 | 9.01 | 9.35 |
| Flame retardant (A) (kg) | 0.835 | 0.65 | 0.42 | 0.36 | 2.94 | 0.90 | 0.19 |
| (wt.%)* | (10.0) | (8.0) | (5.0) | (5.0) | (50.0) | (10.0) | (2.0) |
| Antimony trioxide (kg) | 0.835 | 1.29 | 1.25 | 2.50 | 1.18 | 0.09 | 0.46 |
| (Flame retardant/antimony trioxide weight ratio) | (1.00) | (0.50) | (0.33) | (0.14) | (2.50) | (10.0) | (0.40) |
| Tensile strength at break (kg/cm²) | 534 | 509 | 522 | 454 | 407 | 550 | 540 |
| Tensile elongation at break (%) | 9.8 | 7.5 | 6.9 | 3.4 | 8.0 | 9.0 | 7.5 |
| Heat distortion temperature (°C) | 55 | 56 | 55 | 56 | 47.0 | 55 | 55.5 |
| Toughness | 23.5 | 17.1 | 16.3 | 4.6 | 10.1 | 26.0 | 19.8 |
| Flame resistance (LOI) | 28.5 | 28.0 | 27.0 | 27.0 | 35.0 | 23.5 | 22.0 |
| Appearance of molded article | White. Excellent | White. Excellent | White. Excellent | White. Excellent | White. Inferior in mold releasing property | White. Excellent | White. Excellent |

Note:
*Weight % of flame retardant based on the weight of polytetramethylene terephthalate.

As is clear from Table 3, each of the compositions of the present invention is white, has an excellent appearance with no surface haze, is excellent in mechanical properties, particularly in toughness, is not deteriorated in thermal properties, and is excellent in flame resistance.

Further, it is understood from Table 3 that when the amount of antimony trioxide added is too large as in Comparative Example 5, or when the amount of flame retardant (A) added is too large as in Comparative Example 6, the resulting composition is deteriorated in mechanical properties, particularly in toughness, and is inferior in thermal properties and moldability. It is also understood that when the amount of antimony trioxide added is too small as in Comparative Example 7, or when the amount of flame retardant (A) added is too small as in Comparative Example 8, no sufficient flame retarding effect can be attained.

EXAMPLES 7 to 9

To a sufficiently dried polytetramethylene terephthalate having an intrinsic viscosity [η] of 0.97 dl/g, a flame retardant (B) represented by the formula,

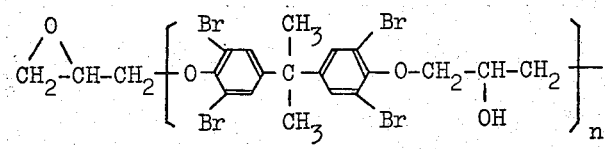

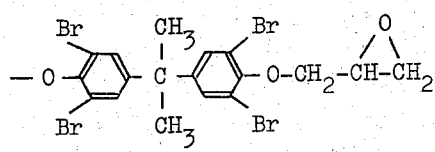

(B)

wherein n ≑ 0.15, bromine content ≑ 50% by weight, and antimony trioxide were added in such proportions as shown in Table 4, and the resulting mmixture was blended for 5 minutes in a V-shaped blender. Subsequently, the mixture was shaped into pellets by means of a vent-type extruder of 40 mm. in diameter at a cylinder temperature of 200° to 240°C. to obtain a flame resistant resin composition of the present invention.

This composition was molded by use of a 36 mm-diameter screw-type injection molding machine of about 5 oz. in volume at a cylinder temperature of 250°C., a mold temperature of 60°C. and a molding cycle of 60 seconds to prepare a dumbbell-shaped, 3.2 mm-thick test piece for tensile test, a 3.2 mm-thick test piece for measurement of impact strength, a 6.4 mm-thick test piece for measurement of heat distortion temperature, and a 1.5 mm-thick test piece for flammability test.

All of these test pieces were white and had quite excellent appearances, without any shrink-mark and warpage and without surface haze due to migration of the flame retardant. These test pieces were tested for mechanical properties, flame resistance, etc. to obtain the results shown in Table 4.

For comparison, test pieces were prepared from only polytetramethylene terephthalate containing no flame retardant. The mechanical properties, etc. of these test pieces were also shown in Table 4.

In Tables 4 to 6, tensile strength at break, tensile elongation at break, flexural strength, modulus of flexural elasticity, Izod impact strength, heat distortion temperature and toughness show values as measured according to the methods described in Example 1.

Flame resistance was determined according to the flammability test specified in UL-94. The flammability test was carried out in such a manner that a flame was applied two times, each for 10 seconds, to a test piece of 12.7 mm × 12.7 mm × 1.5 mm to ignite the test piece, and if the test piece could extinguish the flame within 5 seconds on the average, and does not ignite, by dripping, cotton placed 12 inches below the test piece, it is evaluated to be of the grade V-O; if the test piece could extinguish the flame within 25 seconds on the average and does not ignite the cotton, it is evaluated to be of the grade V-I; and if the test piece could extinguish the flame within 25 seconds on the average but ignites the cotton, it is evaluated to be of the grade V-II. In the test, five test pieces were used each time, and an average of the values obtained was adopted. Even when a test piece has ignited the cotton only once, the test piece is deemed to have a property of igniting the cotton.

Table 4

|  |  | Example 7 | Example 8 | Example 9 | Comparative Example 9 |
|---|---|---|---|---|---|
| Polytetramethylene terephthalate (kg) | | 8.06 | 8.06 | 8.00 | 10.00 |
| Flame retardant (B) (kg) | | 1.29 | 1.46 | 1.60 | — |
| (wt.%)*1 | | (16.0) | (18) | (20) | |
| Antimony trioxide (kg) | | 0.65 | 0.48 | 0.40 | — |
| (Flame retardant/antimony trioxide weight ratio) | | (2) | (3) | (4) | |
| Tensile strength at break (kg/cm$^2$) | | 540 | 555 | 550 | 350 (550)*2 |
| Tensile elongation at break (%) | | 13.0 | 10.2 | 9.4 | 55 (3.9)*2 |
| Flexural strength (kg/cm$^2$) | | 940 | 950 | 965 | 840 |
| Modulus of flexural elasticity (× 10$^4$ kg/cm$^2$) | | 2.35 | 2.4 | 2.25 | 2.35 |
| Izod impact strength (kg.cm/cm) | | 1.1 | 1.2 | 1.1 | 1.0 |
| Heat distortion temperature (°C) | | 53 | 53 | 51 | 54 |
| Toughness | | 30 | 26.8 | 25.0 | 170 |
| Flame resistance | Number of dripping times | 6 | 6 | 8 | Dripped |
| | Number of cotton ignition times | 0 | 0 | 0 | Cotton ignited |
| | Average combustion time (seconds) | 0.5 | 0.4 | 0.45 | Burnt out |
| | Evaluation | V-0 | V-0 | V-0 | Flammable |

Note:
*1Weight % of flame retardant (B) based on the weight of polytetramethylene terephthalate.
*2Figures in the parentheses show yield values.

EXAMPLES 10 to 12

To a sufficiently dried polytetramethylene terephthalate having an intrinsic viscosity [η] of 0.97 dl/g, the flame retardant (B) and antimony trioxide were added in such proportions as shown in Table 5. The resulting mixture was treated in the same manner as in Example 7 to obtain a flame resistant resin composition of the present invention. This composition was subjected to injection molding at a molding temperature of 250°C. to prepare test pieces, which were then tested in the same manner as in Example 7 to obtain the results shown in Table 5.

Table 5

|  |  | Example 10 | Example 11 | Example 12 |
|---|---|---|---|---|
| Polytetramethylene terephthalate (kg) | | 8.06 | 8.20 | 8.47 |
| Flame retardant (B) (kg) | | 1.13 | 0.82 | 0.51 |
| (wt.%)* | | (14) | (10) | (6) |
| Antimony trioxide (kg) | | 0.81 | 0.98 | 1.02 |
| (Flame retardant/antimony trioxide weight ratio) | | (1.4) | (0.83) | (0.5) |
| Tensile strength at break (kg/cm$^2$) | | 530 | 540 | 510 |
| Tensile elongation at break (%) | | 12.0 | 8.8 | 7.9 |
| Flexural strength (kg/cm$^2$) | | 940 | 950 | 930 |
| Modulus of flexural elasticity (× 10$^4$ kg/cm$^2$) | | 2.35 | 2.4 | 2.3 |
| Izod impact strength (kg.cm/cm) | | 1.2 | 1.1 | 1.1 |
| Heat distortion temperature (°C) | | 53 | 53 | 53.5 |
| Toughness | | 28 | 22.5 | 19.2 |
| Flame resistance | Number of dripping times | 6 | 7 | 10 |
| | Number of cotton ignition times | 0 | 0 | 0 |
| | Average combustion time (second) | 0.53 | 1.25 | 5.2 |

Table 5-continued

| | Example 10 | Example 11 | Example 12 |
|---|---|---|---|
| Evaluation | V-0 | V-0 | V-I |

Note:
*Weight % of flame retardant (B) based on the weight of polytetramethylene terephthalate.

EXAMPLE 13

To a sufficiently dried polytetramethylene terephthalate having an intrinsic viscosity $[\eta]$ of 0.90 dl/g, the flame retardant (B) and antimony trioxide were added in such proportions as shown in Table 6. The resulting mixture was treated in the same manner as in Example 7 to obtain a flame-resistant resin composition of the present invention. This composition was subjected to injection molding at a molding temperature of 250°C. to prepare molded test pieces, which were then tested in the same manner as in Example 7, provided that test pieces for measurement of flame resistance were heat-treated in an oven at 150°C. for 7 days, cooled to room temperature in a desiccator and thereafter subjected to flammability test. The results obtained were as shown in Table 6.

For comparison, test pieces were prepared in the same manner as above, except that other flame retardants were used. The test results of these test pieces were also shown in Table 6.

Table 6

| | | Example 13 | Comparative Example 10 | Comparative Example 11 |
|---|---|---|---|---|
| Polytetramethylene terephthalate (kg) | | 8.13 | 8.13 | 8.13 |
| Flame retardant | Kind | Flame retardant (B) | 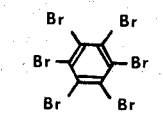 | 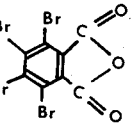 |
| | kg (wt.%)* | 1.22 (15.0) | 1.22 (15.0) | 1.22 (15.0) |
| Antimony trioxide (kg) | | 0.65 | 0.65 | 0.65 |
| (Flame retardant/antimony trioxide weight ratio) | | (1.875) | (1.875) | (1.875) |
| Tensile strength at break (kg/cm²) | | 540 | 508 | 440 |
| Tensile elongation at break (%) | | 12.0 | 4.2 | 1.8 |
| Flexural strength (kg/cm²) | | 925 | 945 | 730 |
| Modulus of flexural elasticity ($\times 10^4$ kg/cm²) | | 2.3 | 2.5 | 2.5 |
| Izod impact strength (kg.cm/cm) | | 1.2 | 1.0 | 0.9 |
| Heat distortion temperature (°C) | | 52.5 | 57 | 47.5 |
| Toughness | | 29 | 8.0 | 2.1 |
| Flame resistance | Number of dripping times | 7 | 5 | 6 |
| | Number of cotton ignition times | 0 | 5 | 5 |
| | Average combustion time (seconds) | 0.5 | 19.7 | 18.5 |
| | Evaluation | V-0 | V-II | V-II |

Note:
*Weight % of flame retardant based on the weight of polytetramethylene terephthalate.

EXAMPLES 14 to 16

To a sufficiently dried polytetramethylene terephthalate having an intrinsic viscosity $[\eta]$ of 1.95 dl/g, a flame retardant of the aforesaid general formula (I), wherein X, $i$, $j$, $k$, $l$, $m$, $n$ and halogen content were varied as shown in Table 7, and antimony trioxide was added in such proportions as shown in Table 7. The resulting mixture was treated in the same manner as in Example 1 to obtain a flame-resistant resin composition of the present invention. This composition was subjected to injection molding at a molding temperature of 250°C. to prepare test pieces, which were then tested in the same manner as in Example 1 to obtain the results shown in Table 7.

Table 7

| | | Example 14 | Example 15 | Example 16 |
|---|---|---|---|---|
| Polytetramethylene terephthalate (kg) | | 8.06 | 8.13 | 7.81 |
| Flame retardant | Kind X= | Bromine atom | Bromine atom | Chlorine atom |
| | i=j=k=l= | 2 | About 4 | 2 |
| | n= | 5 | 1 | 2 |
| | m= | 0 | 1 | 0 |
| | Halogen content (wt.%) | About 52 | About 55 | 32 |
| | kg (wt.%)*¹ | 1.46 (18) | 1.22 (15.0) | 1.56 (20) |
| Antimony trioxide (kg) | | 0.48 | 0.65 | 0.63 |
| (Flame retardant/antimony trioxide weight ratio) | | (3) | (1.875) | (2.48) |

Table 7-continued

|  | Example 14 | Example 15 | Example 16 |
|---|---|---|---|
| Tensile strength at break (kg/cm$^2$) | 390 (511)*² | 415 (535)*² | 402 (520)*² |
| Tensile elongation at break (%) | 19 (7.7)*² | 12 (8.8)*² | 17 (3.7)*² |
| Flexural strength (kg/cm$^2$) | 960 | 925 | 940 |
| Modulus of flexural elasticity (× 10$^4$ kg/cm$^2$) | 2.5 | 2.7 | 2.45 |
| Izod impact strength (kg.cm/cm) | 1.7 | 1.7 | 1.5 |
| Heat distortion temperature (°C) | 52 | 50 | 47.5 |
| Toughness | 55.3 | 29.5 | 49.4 |
| Flame resistance (LOI) | 30.5 | 31.0 | 29.0 |
| Appearance of molded article | White. Excellent. | White. Excellent. | White. Excellent. |

Note:
*¹Weight % of flame retardant based on the weight of polytetramethylene terephthalate.
*²Figures in the parentheses show yield values.

What is claimed is:

1. A flame-resistant resin composition consisting essentially of 100 parts by weight of a polytetramethylene terephthalate, 3 to 40 parts by weight of a flame retardant represented by the general formula (I),

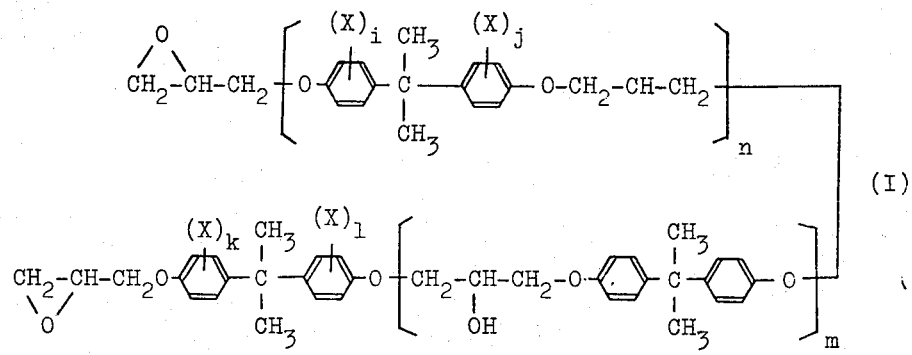

wherein $n + m$, which represents an average degree of polymerization, is a number of 0 to 10; X is a bromine or chlorine atom; and $i, j, k$ and $l$ are individually an integer of 1 to 4, and antimony trioxide, the weight ratio of said flame retardant to said antimony trioxide being in the range of from 0.25 to 6.

2. A composition according to claim 1, wherein the flame retardant is a compound of the general formula (I), in which $m = 0$, and $i = j = k = l = 2$.

3. A composition according to claim 1, wherein the polytetramethylene terephthalate has an intrinsic viscosity of 0.6 to 3 dl/g as measured at 25°C. in an equal weight mixture of tetrachloroethane and phenol.

4. A composition according to claim 1, wherein the amount of the flame retardant of the general formula (I) is 5 to 25 parts by weight.

5. A composition according to claim 1, wherein the average degree of polymerization $n + m$ in the general formula (I) is 1.5 to 10, and the weight ratio of the flame retardant to the antimony trioxide is in the range of from 0.25 to 5.

6. A composition according to claim 1, wherein the average degree of polymerization $n + m$ in the general formula (I) is less than 1.5 including 0, and the weight ratio of the flame retardant to the antimony trioxide is in the range of from 0.25 to 6.

7. A composition according to claim 4, wherein the weight ratio of the flame retardant to the antimony trioxide is in the range of from 0.5 to 4.

8. A composition according to claim 1, wherein the polytetramethylene terephthalate contains less than 40% by weight of other polymer.

9. A composition according to claim 8, wherein the said other polymer is polycarbonate, polystyrene, polymethyl methacrylate, polyethylene terephthalate, polyethylene, polypropylene, ABS resin or nylon.

10. A composition according to claim 1, wherein the polytetramethylene terephthalate has an intrinsic viscosity of 0.9 – 2.0 dl/g as measured in an equal weight mixture of tetrachloroethane and phenol at 25°C and the flame retardant is represented by the formula (I) as defined in claim 1, provided that $n = 0.1 – 5$ and $m = 0$, the amount of the flame retardant being 13 – 20 parts by weight per 100 parts by weight of the polytetramethylene terephthalate, and the weight ratio of the flame retardant to the antimony trioxide being in the range of from 1.4 to 4.

* * * * *